(12) United States Patent
Zhang et al.

(10) Patent No.: US 9,794,083 B2
(45) Date of Patent: *Oct. 17, 2017

(54) METHOD OF TARGETED DISCOVERY OF DEVICES IN A NETWORK

(71) Applicant: Google Technology Holdings LLC, Mountain View, CA (US)

(72) Inventors: Jiang Zhang, La Jolla, CA (US); Petr Peterka, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,338

(22) Filed: Dec. 13, 2016

(65) Prior Publication Data

US 2017/0093592 A1 Mar. 30, 2017

Related U.S. Application Data

(63) Continuation of application No. 12/344,994, filed on Dec. 29, 2008, now Pat. No. 9,538,355.

(51) Int. Cl.
*H04L 12/28* (2006.01)
*H04L 29/06* (2006.01)
(Continued)

(52) U.S. Cl.
CPC ...... *H04L 12/2809* (2013.01); *H04L 61/6022* (2013.01); *H04L 63/0823* (2013.01);
(Continued)

(58) Field of Classification Search
CPC . H04L 12/2809; H04L 61/6022; H04L 67/16; H04L 2012/2841; H04L 2012/2849;
(Continued)

(56) References Cited

U.S. PATENT DOCUMENTS 5,909,183 A 6/1999 Borgstahl et al.
6,084,512 A 7/2000 Elberty et al.
(Continued)

FOREIGN PATENT DOCUMENTS

CN 101385278 3/2009
EP 1710656 10/2006
(Continued)

OTHER PUBLICATIONS

PCT Search Report & Written Opinion, Re: Application #PCT/US2009/065670 dated Jun. 29, 2010.
(Continued)

*Primary Examiner* — Mohamed Barakat
(74) *Attorney, Agent, or Firm* — Fish & Richardson P.C.

(57) ABSTRACT

A targeted discovery between a first device and a second device in a network, in particular, a WHDI network, provides discovery for an identified device or a group of identified devices. The targeted discovery determines an identifier for a second device or a group of devices that the second device belongs to, and sends a device discovery message to the second device using the identifier for the second device when the second device is configured to respond to the device discovery message if the device discovery message includes the identifier for the second device. The first device receives a response to the device discovery message from the second device and can start further communication with the second device.

20 Claims, 7 Drawing Sheets

(51) Int. Cl.
  *H04W 8/00* (2009.01)
  *H04L 29/08* (2006.01)
  *H04L 29/12* (2006.01)
  *H04W 12/08* (2009.01)
(52) U.S. Cl.
  CPC .............. *H04L 67/16* (2013.01); *H04W 8/005* (2013.01); *G06F 2221/2103* (2013.01); *G06F 2221/2117* (2013.01); *G06F 2221/2129* (2013.01); *H04L 2012/2841* (2013.01); *H04L 2012/2849* (2013.01); *H04W 12/08* (2013.01)
(58) Field of Classification Search
  CPC ............ H04W 8/005; G06F 2221/2103; G06F 2221/2117
  See application file for complete search history.

(56) References Cited

U.S. PATENT DOCUMENTS

| | | | |
|---|---|---|---|
| 6,199,136 B1 | 3/2001 | Shteyn | |
| 6,591,364 B1 | 7/2003 | Patel | |
| 6,741,852 B1 | 5/2004 | Mohrs | |
| 6,826,607 B1 | 11/2004 | Gelvin et al. | |
| 6,980,660 B1* | 12/2005 | Hind | H04L 63/0823 |
| | | | 380/277 |
| 6,983,370 B2 | 1/2006 | Eaton et al. | |
| 6,995,655 B2 | 2/2006 | Ertin et al. | |
| 7,020,121 B2 | 3/2006 | Hardacker et al. | |
| 7,092,670 B2 | 8/2006 | Tanaka et al. | |
| 7,340,612 B1* | 3/2008 | Durand | H04L 63/062 |
| | | | 713/182 |
| 7,430,758 B2 | 9/2008 | Toutonghi | |
| 7,511,762 B2 | 3/2009 | Elnathan et al. | |
| 7,511,765 B2 | 3/2009 | Ono | |
| 7,613,426 B2 | 11/2009 | Kuehnel et al. | |
| 7,657,930 B2* | 2/2010 | Park | H04L 63/08 |
| | | | 709/225 |
| 7,912,076 B2 | 3/2011 | Kim et al. | |
| 8,001,381 B2 | 8/2011 | Metke et al. | |
| 8,001,584 B2 | 8/2011 | Lortz et al. | |
| 8,014,355 B2 | 9/2011 | Koga | |
| 8,036,384 B2* | 10/2011 | Zick | H04L 63/0853 |
| | | | 380/255 |
| 8,185,049 B2 | 5/2012 | Zhang et al. | |
| 8,189,627 B2 | 5/2012 | Xia et al. | |
| 8,239,551 B2 | 8/2012 | Oda et al. | |
| 8,276,209 B2 | 9/2012 | Knibbeler et al. | |
| 2002/0037708 A1 | 3/2002 | Mccann et al. | |
| 2002/0061748 A1 | 5/2002 | Nakakita et al. | |
| 2002/0077077 A1 | 6/2002 | Rezvani et al. | |
| 2002/0157002 A1 | 10/2002 | Messerges et al. | |
| 2003/0045280 A1 | 3/2003 | Simons | |
| 2003/0095521 A1 | 5/2003 | Haller et al. | |
| 2004/0066278 A1* | 4/2004 | Hughes | G06F 21/31 |
| | | | 340/10.1 |
| 2005/0014503 A1 | 1/2005 | Nakakita et al. | |
| 2005/0210261 A1 | 9/2005 | Kamperman et al. | |
| 2006/0105712 A1 | 5/2006 | Glass et al. | |
| 2006/0116107 A1 | 6/2006 | Hulvey | |
| 2006/0156340 A1 | 7/2006 | Choi | |
| 2006/0177066 A1 | 8/2006 | Han et al. | |
| 2006/0224893 A1 | 10/2006 | Sales et al. | |
| 2006/0288209 A1 | 12/2006 | Vogler | |
| 2007/0079362 A1 | 4/2007 | Lortz et al. | |
| 2007/0106894 A1 | 5/2007 | Zhang et al. | |
| 2007/0107020 A1 | 5/2007 | Tavares | |
| 2007/0118879 A1 | 5/2007 | Yeun | |
| 2007/0133485 A1* | 6/2007 | Tredoux | H04L 67/18 |
| | | | 370/338 |
| 2007/0141986 A1 | 6/2007 | Kuehnel et al. | |
| 2007/0150720 A1 | 6/2007 | Oh et al. | |
| 2007/0152826 A1 | 7/2007 | August et al. | |
| 2007/0178884 A1 | 8/2007 | Donovan et al. | |
| 2007/0277224 A1 | 11/2007 | Osborn et al. | |
| 2008/0004041 A1* | 1/2008 | Ahn | H04W 64/00 |
| | | | 455/456.1 |
| 2008/0066120 A1 | 3/2008 | Igoe | |
| 2008/0079601 A1 | 4/2008 | Ishihara et al. | |
| 2008/0123739 A1 | 5/2008 | Reznic et al. | |
| 2008/0134309 A1 | 6/2008 | Qin et al. | |
| 2008/0250147 A1 | 10/2008 | Knibbeler et al. | |
| 2008/0301436 A1 | 12/2008 | Yao et al. | |
| 2008/0313462 A1 | 12/2008 | Zhao et al. | |
| 2009/0061835 A1 | 3/2009 | Schmidt et al. | |
| 2009/0103471 A1 | 4/2009 | Candelore | |
| 2009/0122201 A1 | 5/2009 | Freundlich et al. | |
| 2009/0132941 A1 | 5/2009 | Pilskalns et al. | |
| 2009/0157521 A1 | 6/2009 | Moren et al. | |
| 2009/0177511 A1 | 7/2009 | Shaw et al. | |
| 2009/0217043 A1 | 8/2009 | Metke et al. | |
| 2009/0235304 A1 | 9/2009 | Hardacker et al. | |
| 2009/0240941 A1 | 9/2009 | Lee et al. | |
| 2009/0241040 A1 | 9/2009 | Mattila et al. | |
| 2009/0247197 A1 | 10/2009 | Graff et al. | |
| 2009/0322948 A1 | 12/2009 | Funabiki et al. | |
| 2010/0030904 A1 | 2/2010 | Oda et al. | |
| 2010/0071010 A1 | 3/2010 | Elnathan et al. | |
| 2010/0135259 A1* | 6/2010 | Lee | H04L 5/14 |
| | | | 370/336 |
| 2010/0169399 A1 | 7/2010 | Moroney et al. | |
| 2010/0169646 A1 | 7/2010 | Zhang et al. | |
| 2010/0315997 A1* | 12/2010 | Kim | H04N 21/43615 |
| | | | 370/328 |
| 2010/0325654 A1 | 12/2010 | Moroney et al. | |
| 2011/0047583 A1 | 2/2011 | Howard et al. | |
| 2011/0268274 A1 | 11/2011 | Qiu et al. | |

FOREIGN PATENT DOCUMENTS

| | | |
|---|---|---|
| EP | 1804428 | 7/2007 |
| EP | 1881664 | 1/2008 |
| JP | 2000078669 | 3/2000 |
| JP | 2001054171 | 2/2001 |
| JP | 2001523419 | 11/2001 |
| JP | 2008035517 | 2/2008 |
| KR | 100703018 | 10/2006 |
| KR | 10-2006-00113926 | 11/2006 |
| KR | 10-0778477 | 11/2007 |
| WO | 9818234 | 4/1998 |
| WO | 2007094347 | 8/2007 |
| WO | 2008002081 | 1/2008 |
| WO | 2008140266 | 11/2008 |

OTHER PUBLICATIONS

PCT Search Report & Written Opinion, Re: Application #PCT/US2009/066529; dated Jun. 28, 2010.
PCT Search Report & Written Opinion, Re: Application #PCT/US2009/066178; dated Jun. 22, 2010.
PCT Search Report & Written Opinion, Re: Application #PCT/US2009/066174; dated Jun. 23, 2010.
Menezes, et al, "Handbook of Applied Cryptography", 1996; Chapter 12, pp. 489-541.
Soriente, et al, "BEDA: Button-Enabled Device Association", First International Workshop on Security for Spontaneous Interaction; Sep. 2007.
Wireless Horne Digital Interface: accessed at http://www.whdi.org/Technology/, accessed on Mar. 25, 2010, pp. 2.
Barker, E, and Kelsey, J., "Recommendation for Random Number Generation Using Deterministic Random Bit Generators (Revised)," NISY Special Publication 800-90, pp. 133 (2007).
International Search Report and Written Opinion for International Application No. PCT/US2010/038963, European Patent Office, The Hague, Netherlands. dated Sep. 22, 2010.
European Patent Office, "Extended European Search Report" for European Application No. 09836624.8 (BCS05333) dated Jul. 19, 2013, 6 pages.
European Patent Office, "Extended European Search Report" for European Application No. 09836653.7 (BCS05338) dated Jul. 26, 2013, 7 pages.

(56) References Cited

OTHER PUBLICATIONS

U.S., "Notice of Allowance and Fee(s) Due" for U.S. Appl. No. 12/816,817 (BCS05892) dated May 14, 2013, 10 pages.
European Patent Office, "Extended European Search Report" for European Application No. 09836638.8 (BCS05335) dated Jul. 22, 2013, 8 pages.
Japanese Patent Office "Decision of Rejection" for Patent Application No. 2012-516290 (BCS05892) dated Aug. 20, 2013, 2 pages.
European Patent Office, "Extended European Search Report" for Patent Application No. 09836637.0 (BCS05287) dated Nov. 21, 2013, 5 pages.
Extended European Search Report issued in European 8Application No. 17165962.6, dated Jul. 28, 2017, 8 pages.

* cited by examiner

METHOD OF TARGETED DISCOVERY OF DEVICES IN A NETWORK

RELATED APPLICATIONS

This application is a continuation of U.S. application Ser. No. 12/344,994, entitled "Method of Targeted Discovery of Devices in a Network", filed Dec. 29, 2008, the contents of which are incorporated herein.

The present invention is related to U.S. patent application Ser. No. 12/345,010, entitled "Personal Identification Number (PIN) Generation between Two Devices in a Network", filed Dec. 29, 2008; U.S. application Ser. No. 12/344,997, entitled "Secure and Efficient Domain Key Distribution for Device Registration", filed Dec. 29, 2008; and U.S. application Ser. No. 12/345,002, entitled "Multi-Mode Device Registration", filed Dec. 29, 2008; each of which are incorporated by reference in their entireties.

BACKGROUND

The WIRELESS HOME DIGITAL INTERFACE (WHDI) is a wireless standard proposed for a wireless multimedia device network, which may be used at home, in the office or in other short-range wireless network environments. WHDI allows for high bandwidth wireless channels for sending content between devices, which may support uncompressed High Definition (HD) content. For example, a DVD player may be connected to multiple HDTVs wirelessly and send uncompressed content to the HDTVs using WHDI. WHDI eliminates the need for cabling, such as High Definition Multimedia Interface (HDMI) cables, component cables, etc., used to transmit uncompressed content between devices. Conventional wireless technologies such as 802.11, BLUETOOTH, etc., do not have the bandwidth or interface to transmit uncompressed multimedia content between devices.

WHDI can be used in various environments. For example, a user located in a single family home or in an apartment may connect a DVD player, an MP3 player, a laptop/notebook or desktop personal computer (PC), a gaming console, and flat panel TVs all together, wirelessly, using WHDI. In another environment, a user wirelessly connects a multimedia projector in a conference room to a desktop PC in his office, and to a set of notebook computers of numerous meeting participants using WHDI. In these examples and other examples, security is a concern because of the wireless communication between the WHDI devices. Due to the nature of wireless networks, typically they are easy to identify by unauthorized users. Also, an unauthorized user may attempt to identify and connect to the particular devices connected in a home WHDI network. The homeowner may desire to keep the identity of their devices private and their devices away from the unauthorized users. For example, a homeowner may not want a neighbor to know they have five HDTVs, or they may not want any non-family members to know they have a server connected to their home network because the server may contain confidential information, such as personal videos, etc. While WHDI provides the protocol and interfaces for high-bandwidth wireless networks, WHDI may lack the security procedures to maintain user privacy. The present invention provides methods to protect a user's privacy based on the user's current needs for using the WHDI devices in a WHDI network.

BRIEF DESCRIPTION OF THE DRAWINGS

Features of the present invention will become apparent to those skilled in the art from the following description with reference to the figures, in which.

DETAILED DESCRIPTION

Figure 1:
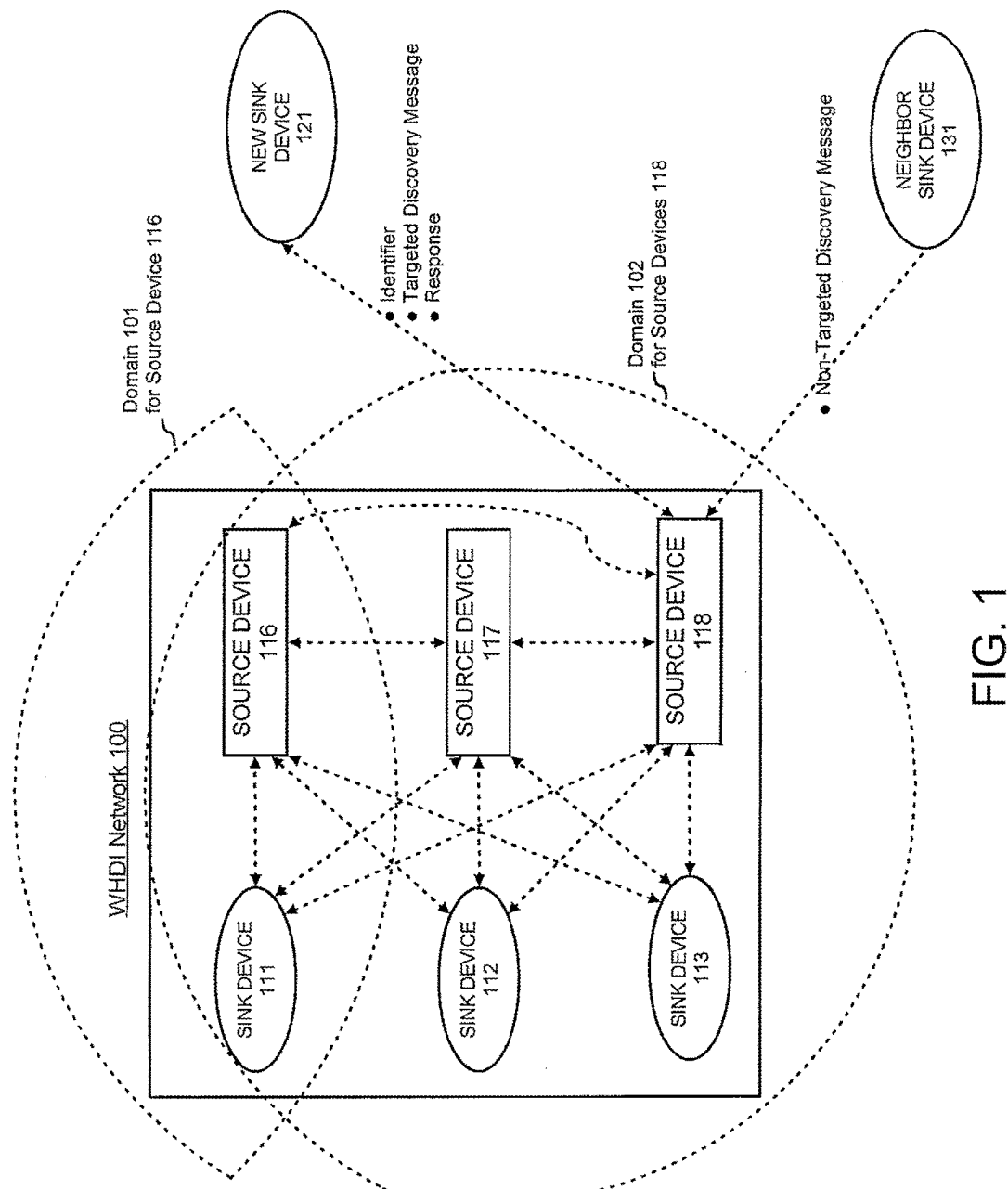
FIG. 1 illustrates a simplified block diagram of a WHDI network, according to an embodiment of the present invention.

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Embodiments of the present invention provide a more secure method and system for a device to discover other currently available wireless device(s) and receive some information which is needed to start communication between the devices. The communication may be any type of communication, e.g. verifying device certificate, generating and verifying Personal Identification Numbers (PINs), exchanging a device registration key and delivering the domain key in a network. The network may be a WHDI network.

WHDI is a proposed standard for high bandwidth wireless digital data connectivity between multiple points. WHDI wirelessly transmits multimedia data, such as high definition video and the associated audio data, from source devices to sink devices in the WHDI network reliably. Devices in a WHDI network are referred to as WHDI devices, and a WHDI network includes WHDI devices communicating wirelessly amongst each other using the WHDI standard. WHDI devices are characterized as two types. One type is a source device and the other type is a sink device. A WHDI device may be a source device, a sink device, or both depending on its functionality. A source device transmits data streams across a WHDI network to a sink device, and a sink device receives data streams across the WHDI network from the source device. Examples of source devices are set-top box, notebook Personal Computer (PC), desktop PC, DVD player, MP3 player, video camcorder, audio/video receiver, gaming console, etc. Examples of sink device are TVs, PCs, projectors, etc.

Many device networking technologies including WHDI face the issue of how to securely allow a new device to become part of any existing network. According to an embodiment, a Personal Identification Number (PIN) is used during a device registration process to allow a new device to become part of the network. The device registration is a process to let a new device join another device or a network of devices in a domain. A domain is a group of devices that are approved to share content with each other. Device registration or domain registration includes the process of approving or denying a device to join a device or a domain. Device registration can provide a user with control over which devices are allowed to connect to other device(s) in the user's domain. So if a family has a domain, then all the devices owned by the family may be members of the domain, but a friend's device may not be allowed to join the domain.

Prior to a new device being allowed to connect to an existing device or join a domain, the new device must be authorized or pre-approved to ensure that the new device is a device that a user wants to connect to the existing device or be in the domain. The new device first needs to be verified if it is a WHDI standard compliant device. Whether a device is a WHDI standard compliant device can be verified by an existence of a valid WHDI certificate in the device, which was issued by the WHDI certificate authority. For example, a family member purchases a new TV, and the family member wants the TV to become part of the family domain, so the TV can play content received from other devices in the family domain, such as a set-top box or a DVD player. However, if a neighbor purchases a TV, the family member likely does not want the neighbor's TV in the family's domain. Furthermore, through a wireless network, the neighbor's TV may inadvertently attempt to become part of the family domain. In order to limit this possibility, a PIN generation method is described in U.S. application Ser. No. 12/345,010, entitled "Personal Identification Number (PIN) Generation between Two Devices in a Network", filed Dec. 29, 2008, to determine whether a new device is authorized to join a domain. The PIN may also be used to generate a device registration key, which is used to securely distribute the domain key that is used by the new device to join the domain.

After a device is determined to be authorized, for example, through exchange of WHDI certificates, according to an embodiment, the PIN is used to generate a device registration key (also referred to as a session key). The session key is used to securely distribute a domain key to a new authorized device, so the new device can join the domain. According to an embodiment, the session key is normally generated using some random numbers. Three random numbers may also be used to generate the session key, where the third random number may be the PIN or another random number.

FIG. 1 illustrates a simplified block diagram of a WHDI network 100 according to an embodiment of the present invention. WHDI network 100 of FIG. 1, for example, shows a set of sink devices 111-113 and a set of source devices 116-118.

In one embodiment with respect to the WHDI network 100, the sink device 111 is a flat panel HDTV in a living room, the sink device 112 is a TV in a kitchen, such as a TV installed on a refrigerator, and the sink device 113 is a TV for a treadmill. Further, the source device 116 is a notebook PC, the source device 117 is DVD player, and the source device 118 is a gaming console. It will be apparent that the WHDI network 100 may include additional sink devices and/or additional source devices not shown and that some of the sink devices and the source device described herein maybe removed or new WHDI devices added.

The source devices 116, 117, and 118, respectively may be any source of content, such as a video content, audio content, or other data content from the Internet. Each of the source devices 116, 117, and 118 may have independent and possibly different content. Also, any one of the source devices 116, 117, and 118 may be connected to one or more of the sink devices 111, 112, and 113 simultaneously (e.g., for multicasting) or separately (e.g., unicasting).

When the sink device 111 attempts to connect to the source device 116 wirelessly within the WHDI network 100 for the first time, the sink device 111 needs to know whether the source device 116 is a secure device for the sink device 111. At the same time, the source device 116 also needs to know whether the sink device 111 is a secure device for the source device 116. Secure device means that the device is a WHDI standard compliant device and the device is authorized to connect to the other device. Whether a device is a WHDI standard compliant device can be verified by an existence of a valid WHDI certificate in the device, which was issued by the WHDI certificate authority. An authorized device may be a device not owned by a family member, such as a neighbor's device or a friend's device. Because the neighbor's device or a friend's device may come within range of the WHDI network 100, these unauthorized devices may advertently or inadvertently attempt to join the family domain. An example of a new authorized device may be a new TV purchased by the family. If the source device 116 is a media player of your neighbor who wants to stream data of an adult content or an unsolicited advertisement to your HDTV while you are watching a DISNEY channel with kids, the source device 116 would not be a secure device for the sink device 111 either.

One way of verifying whether the source device 116 is a secure device for the sink device 111 is that the source device 116 provides its valid WHDI device certificate to the sink device 111 and the sink device 111 generates a PIN for the source device 116 using a method described in further detail below. At the same time, the source device 116 also verifies whether the sink device 111 is a secure device for it by validating the sink device 111's certificate and optionally whether the generated PINs are matching. For example, PIN generation can be accomplished by entering specified input choices, such as pressing particular buttons on the source device 116, pressing buttons in a particular sequence on the source device 116, etc., following one or more instructions from the sink device 111. This way, a user who wants to connect a new device to an existing WHDI device has a simplified method of a PIN generation and entry for the existing WHDI device, for example, by using the interface on the WHDI device.

It is more secure and user-friendly to let the devices generate a PIN at runtime than using a specific PIN already pre-assigned for a particular source device, because it reduces the possibility of the PIN being stolen or the PIN being forgotten by the user. With respect to the certificate validation, a WHDI device initially be loaded with a certificate in the factory as well as the device's identification. Thus, the WHDI device certificates of both devices have to be validated first. After validating each other's certificate, each device also gets the other device's public key, which can be used to encrypt and protect the data transmitted between these two devices.

In FIG. 1, the sink device 111 generates a PIN for the source device 116 based on the type of inputs at the source device 116, such as pressable buttons, or other user input options. The source device 116 can also take part in the PIN generation process by providing some random values to the sink device 111. These random data can be encrypted using the sink device 111's public key and the sink device 111 can decrypt it using its own private key. Once the sink device 111 generates a PIN for the source device 116, the PIN or information needed to generate the PIN is communicated to the source device 116 through the user. After the sink device 111 generates the PIN, indicates user entries, and they are entered at the source device, and the generated PIN is the same, the devices may register with each other and the new device may join the existing domain in the WHDI network 100. The domain is used in WHDI to define one or more WHDI devices that a particular WHDI device is authorized to send and/or receive content. This entire PIN generation process is a user friendly and secure method. This method may be performed using a Graphical User Interface (GUI) displayed on one or more of the WHDI devices. Also, an administrative GUI may be provided to manage domains.

The WHDI network 100 also provides the ability to stream the persistently-stored content from the initial source device to another sink device or from the initial source device to another source device that has been authenticated as part of the WHDI network. In one embodiment, this allows a media server as a source device, e.g., a dual-tuner set-top box ("STB") with hard drive, to deliver recorded content to any sink device such as TV, in the house by streaming to a targeted sink device such as HDTV. Of course, it is noted that while a home network is described, extensions to a business, education, public entertainment or other such local wireless network are analogous.

FIG. 1 also shows a new sink device 121 and a neighbor's sink device 131. The new sink device 121 may be a new TV the user of the WHDI network 100 bought. When the user tries to connect the new sink device 121 to the source device 118, the new sink device 121 shall include an identifier in the targeted discovery message for the source device 118 so that the source device 118 can respond to the new sink device 121. On the contrary, when the neighbor's sink device sends a generic discovery message, which is not targeted to any specific source device, the user of the WHDI network 100 may not want the user's source devices to be discoverable to the neighbor's sink device. A "discovery message" is used for discovering which devices are currently available for the device that sends the discovery message. Once a device discovery is performed and if the device is discovered, then the discovering device may start to communicate with the discovered device. One example of the communication could be a message to generate and verify a PIN that is used to register the new device.

If the neighbor's sink device 131 discovers one of the user's source device, e.g. the source device 118, or all of the user's devices including the source devices and the sink devices, it is an undesirable situation because the user may not want the neighbor to know what types and quantities of the user's devices are.

In one embodiment, an authorized WHDI sink device tries to discover available WHDI source devices using an identifier for a particular source device as depicted in FIG. 1. For example, the new sink device 121 that the user knows the existence of the source devices can discover the currently available source devices, such as the source device 116, the source device 117, and the source device 118 within the user's home WHDI network 100. In another embodiment, a nearby WHDI device, such as the neighbor's sink device 131 that the user does not know the existence of the source devices may try to send a discovery message to the user's WHDI devices to discover which devices are available in the user's home. Therefore, the user may want to make a device be discovered only by the devices the user permits but not by any other devices. To accommodate this situation, a method for targeted discovery between a first device and a second device in a wireless network is presented in the present invention. The targeted discovery method is used at different stages for a device, such as before the device registration, or before the device association that is after the device registration. The targeted discovery method according to an embodiment of the present invention will be described in further detail below after describing the methods for generating a PIN among the different devices and transferring a domain key between a first device and a second device.

Figure 2:
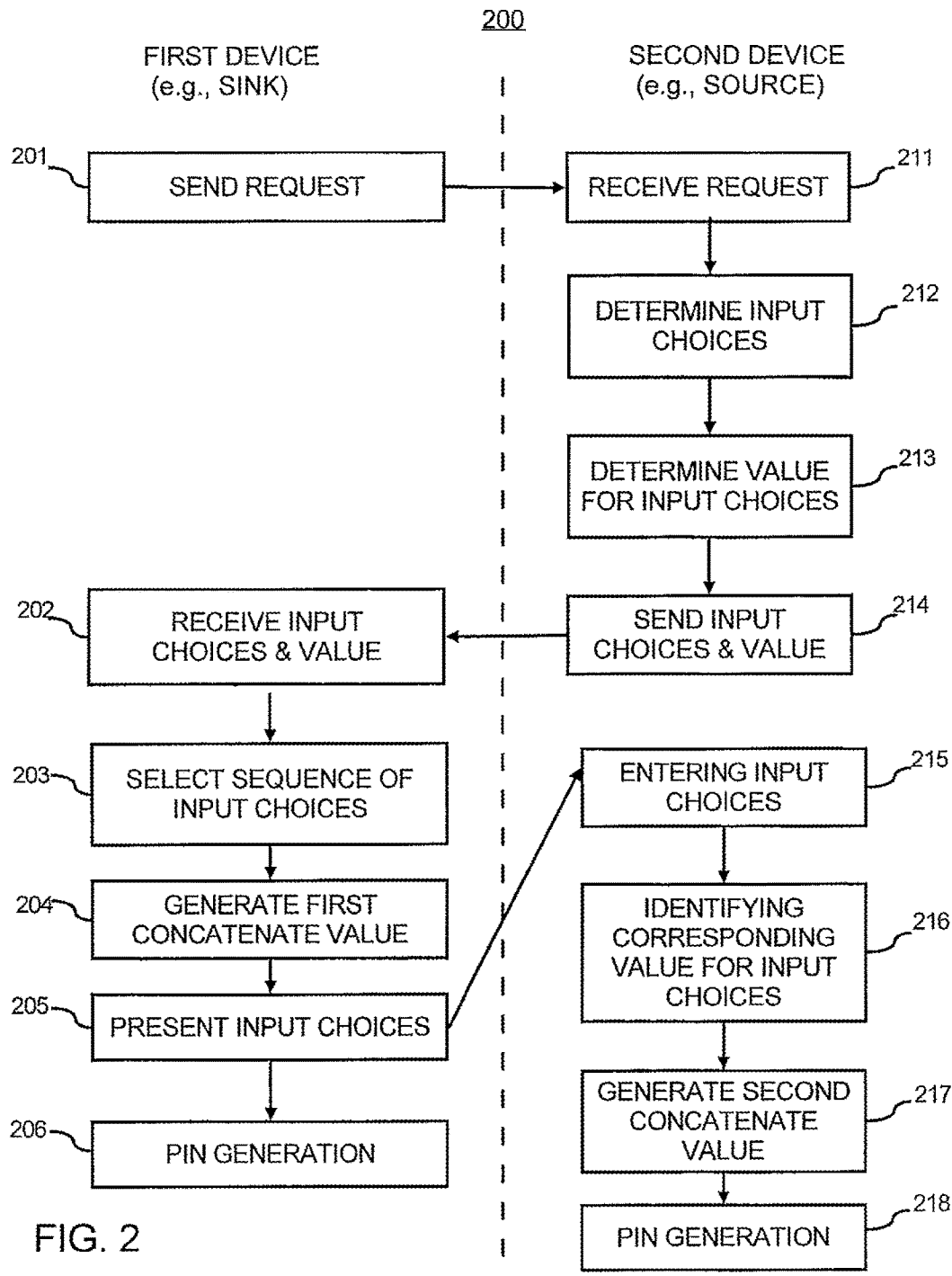
FIG. 2 illustrates a flow diagram of a method for generating and entering a PIN for a domain key between a first device and a second device in a wireless network, according to an embodiment of the present invention.

FIG. 2 illustrates a flow diagram of a method 200 for generating a PIN between a first device and a second device in a wireless network, according to an embodiment of the present invention. In one embodiment, the wireless network is a WHDI network including end user home or office devices. Therefore, in one embodiment, the first device may be a sink device and the second device may be a source device in FIG. 1, which is configured to generate a PIN. The method 200 may be provided to other non-WHDI networks, which are wireless or wired.

Also, FIG. 2 shows steps performed by a first device and a second device to generate a PIN. In one embodiment, the first device is a sink device and the second device is a source device, such as the sink and source devices described with respect to FIG. 1 in a WHDI network.

At step 201, the first device sends a request to the second device. The request is a message that invokes the PIN generation method 200. Although the step 201 can be an option, the first device's certificate is sent to the second device when the first device sends a request to the second device and the second device uses the public key in the certificate to encrypt the random values for the button list in the following steps. So the encryption key may be included in the request. If the second device is already registered to the first device, the second device may reply to the first device with a message authenticated by the previously shared registration key so that the first device can recognize the second device as an option, or the second device may allow the registration process to continue and overwrite the old registration data if the new registration succeeds. If the second device is not registered to the first device, it means that the first device never generated a PIN for the second device previously and the second device does not have a registration key for connecting to the first device and further to the WHDI network, which the first device belongs to. When the second device is not registered to the first device, it shall proceed to the next step. In one embodiment, once the second device receives the request for the registration and replies, the second device may enable its buttons for the directed user entry mode for a predetermined period until the button(s) is pressed, otherwise it times out. During the user entry mode, the buttons shall be considered being used for that purpose only. For each WHDI source device, it is possible that the manufacturer may specify a list of buttons and button names that can be used for user entry and subsequent PIN generation.

At step 211, the second device receives the request. The received request, for example, places the second device in a user entry mode, where buttons or other manual inputs on the second device are used for PIN generation.

At step 212, the second device determines input choices, and at step 213, the second device determines values for each input choice. An input choice is information that can be input into the second device. The input choice typically is information that can be manually entered into the second device. In one example, the input choices are associated with buttons on the second device. Examples of input choices of the second device are a set of keypad or button list for function keys, such as "PLAY", "STOP", "PAUSE", and "ENTER" depends on the type of the second device. For example, a DVD player as a second device may have buttons for "PLAY", "STOP", and "PAUSE" that are input choices. In another example, a notebook PC may use keys on its keyboard as input choices. Another example of an input choice may be a number of clicks of a button. Such as 3 clicks on PLAY and 2 clicks on PAUSE.

A value is determined for each input choice. Each value may be a random number. Each value may be generated by the second device, for example, using a random number generator, or pre-stored in the second device, such as during the manufacture process.

In one example, the input choices and values are comprised of a button list. The button list includes a button name and value for each button of a set of buttons on the second device. One example of a button list is {(PLAY, 10), (PAUSE, 13), (STOP, 24)}.

At step 214, the second device transmits the input choices and corresponding values to the first device. The transmission should be secured, for example, by encrypting the information being transmitted, so that any other party cannot see the information. For example, when a button list is transmitted to the first device over the WHDI network, if the first device has sent its WHDI device certificate to the second device, the second device may use the first device's public key, which it obtained from the certificate, to encrypt the input choices information. The second device may keep the input choices and corresponding values until the registration process is over.

At step 202, the first device receives the input choices and corresponding values from the second device. If the information is encrypted, the first device must decrypt it first. For example, the button list is received from the second device and the first device must use its private key to decrypt the information first.

At step 203, the first device selects a sequence of the input choices. The sequence may be selected randomly. For example, if the button list is {(PLAY, 10), (PAUSE, 13), (STOP, 24)}, the first device selects a random sequence of the buttons, such as {(STOP, 24), (PLAY, 10), (PAUSE, 13)}. The number of input choices in the sequence can also be determined by the first device randomly. Also, an input choice can be repeated multiple times or not used at all in the sequence.

At step 204, the first device generates a first concatenated value from the values in the selected sequence. There are various ways to concatenate such values. For example, the sequence is STOP, PLAY, PAUSE. The corresponding values are 24, 10, and 13, respectively. The first concatenated value could be 241013, or the values can be concatenated in binary values, or the values can be concatenated after a transformation, such as adding a number (e.g. 5) to each value, as long as both devices do the same transformation. This step may be performed anytime after the sequence is selected.

At step 205, the first device presents only the input choices, and not the corresponding values, in the selected sequence. In one embodiment, the presentation of the sequence may include an audio or visual presentation. For example, if the first device is a TV, the TV displays the sequence of STOP, PLAY, PAUSE. Thus, the presentation can be to a user.

At step 215, the input choices are entered in the second device. This may include manual entry. For example, the user views the displayed sequence of STOP, PLAY, PAUSE, and pushes STOP, PLAY, PAUSE buttons in that order on the second device.

At step 216, the second device identifies the corresponding value for each input choice. For example, the button list is stored in the second device and is retrieved to determine the corresponding value for each input choice.

At step 217, the second device generates a second concatenated value from the values in the sequence of the entered input choices. For example, the sequence is STOP, PLAY, PAUSE. The corresponding values are 24, 10, and 13, respectively. The second concatenated value is 241013. Also there are many ways to concatenate the values with or without transformation, as long as both devices use the same approach.

The concatenated values formed at the first and second devices are the PINs. In other words, each device calculates its own PIN as represented by steps 206 and 218. If both devices generate the same PIN, then one device would be allowed to become a member of the domain or connect to the other device. There are many methods to verify whether these two devices generate the same PIN. The second device may send the PIN back to the first device securely for the first device to verify directly, or the second device may send some data derived from the PIN to the first device for the first device to verify indirectly. In one embodiment, the second device may derive a device registration key from the PIN generated by its own, or from the PIN and some other secret data shared between these two devices, and then use the derived the key to generate a Message Authentication Code (MAC) over an acknowledgement message sent back to the first device. After receiving the acknowledgement message with the MAC from the second device, the first device will use the PIN generated by its own, or use the PIN with some other secret data shared between the two devices, to derive a device registration key, and then use the derived key to verify the acknowledgement message's MAC. If the MAC is verified, which also means the second device has generated the right PIN to derive the right key. Thus, the PINs generated by these two devices are indirectly verified to be same. If the MAC verification failed, which means the PIN generated by the second device may not be same as the PIN the first device generated. If so, the PIN verification failed and these two devices may not be able to connect with each other to share content. The user may restart the process again to make the PIN verification successful, such that the first device and second device may effectively belong to the same domain or connect to each other, and can communicate further.

In another embodiment, after step 203, the first device presents the sequence of input choices to the second device. The presented input choices are entered in the second device. The second device securely sends the entered input choices to the first device, e.g. the entered choices may be encrypted using a key shared by these two devices. If the entered input choices match the input choices presented, then the PINs are verified and the two devices may communicate further, e.g. a device registration key can be exchanged and stored by the two devices for future communication. In this embodiment, a PIN does not need to be generated by concatenating information for the input choices. Instead, the input choices selected at the first device and presented to the second device are the PIN. Also, note that the input choices selected at the first device in this embodiment or the embodiments described above can be a subset of the input choices received from step 214.

As described above, the button list includes input choice, value pairs. In another embodiment, the button list does not include values, and may only include the input choices, such as only a set of buttons on the second device. Then the first device can select and display a sequence of the input choices and use this sequence in some fashion to generate a PIN. The second device, after having the input choices entered by a user in the correct sequence, can also use a matching approach to generate the PIN.

Note that the method 200 provides security because a user of an unauthorized first device would not be able to access the second device and enter the input choices to generate the same PIN on the second device using the method 200.

In one embodiment, the components of the WHDI network 100 in FIG. 1 can be grouped into subsystems. These WHDI subsystems interact with other devices throughout the system, including source devices and their accompanying sink devices, to share the content resident within or sent to the WHDI network 100.

An embodiment of a method in which the WHDI network 100 as well as the method 200 may be employed for distributing a domain key for device registration in a domain among different WHDI devices will now be described with respect to the following flow diagram of the method 300 depicted in FIGS. 3A and 3B. It should be apparent to those of ordinary skill in the art that the method 300 represents a generalized illustration and that other steps may be added or existing steps may be removed, modified or rearranged without departing from the scopes of the method 300. In addition, the method 300 is described with respect to the WHDI network 100 and the method 200 by way of example and not limitation, and the method 300 may be performed in other types of networks that may be wired or wireless.

Figure 3A:
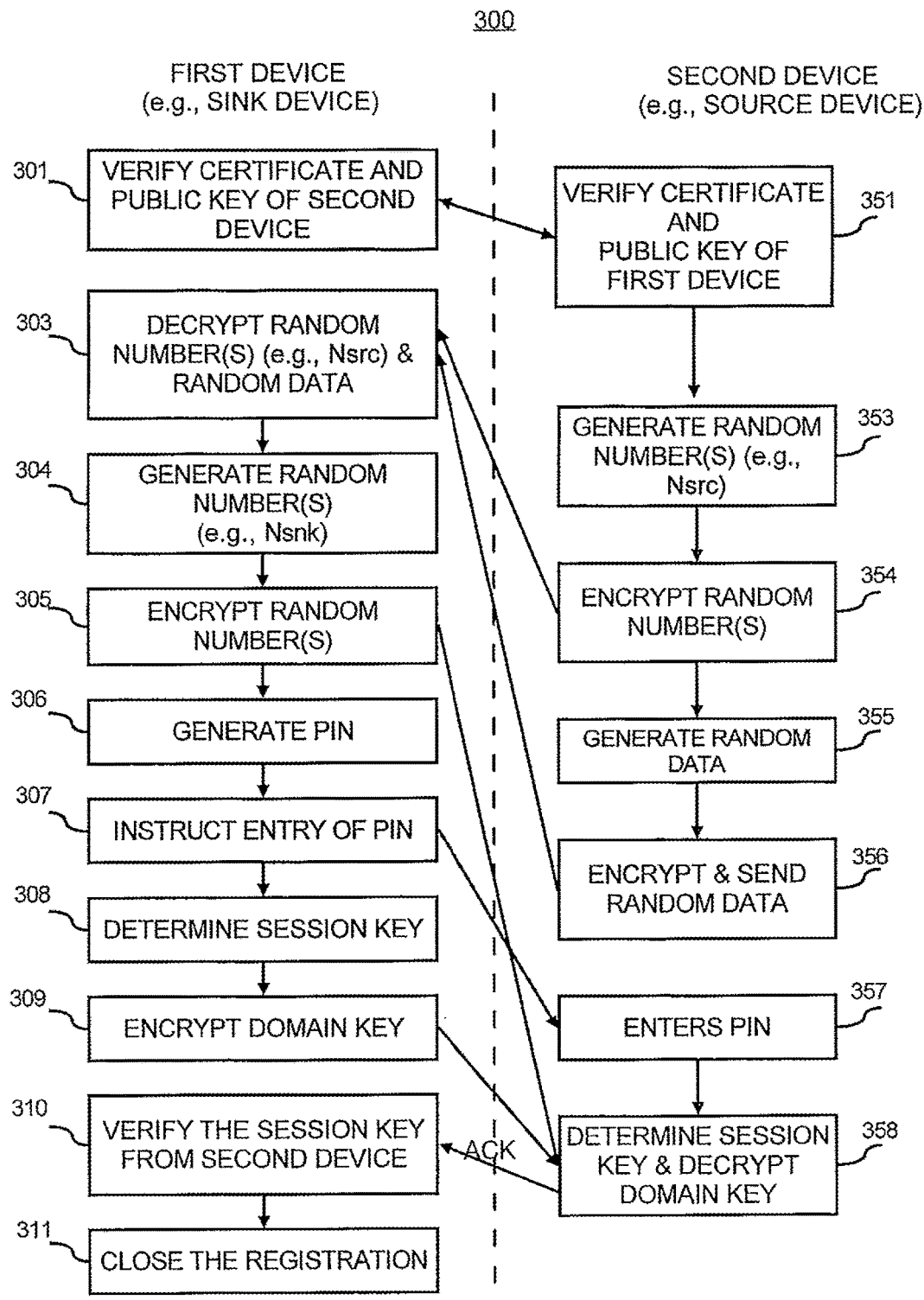
FIG. 3A illustrates a flow diagram of a method for securely delivering a domain key for device registration between a first device and a second device in a wireless network, according to an embodiment of the present invention.

FIG. 3A illustrates a flow diagram of a method 300 for securely distributing a domain key for device registration between a first device and a second device in a wireless network, according to an embodiment of the present invention. In one embodiment, the first device is the sink device 111 and the second device is the source device 116 shown in FIG. 1. In one embodiment, the sink device 111 has a domain key and will distribute the domain key securely to the source device 116. In the other embodiment, the source device 116 has a domain key and will distribute the domain key securely to the sink device 111.

At steps 301 and 351, the first and second devices verify that each device is a certified WHDI device. The first device provides its valid WHDI device certificate to the second device and the second device provides its valid WHDI device certificate to the first device. At step 301, the first device verifies the certificate of the second device and at step 351, the second device verifies the certificate of the first device. Device authorization may be performed using the method 200 to determine that a device requesting to join a domain is an authorized device. After the first and second devices authenticate and authorize, as described above with respect to the steps 301 and 351, exchange of information for generating a session key begins.

At steps 353, a random number is generated at the second device. This random number is referred to as Nsrc. At step 354, Nsrc is encrypted using the public key from the certificate of the first device and sent to the first device. For example, the second device transmits Nsrc over a WHDI network to the first device, and Nsrc is encrypted with the public key of the first device.

At steps 355 and 356, random data is generated at the second device, encrypted and sent to the first device. Steps 355 and 356 are optional. The random data may be used by the first device to generate a PIN, or other data may be used to generate a PIN.

At step 303, the first device decrypts Nsrc and the random data. At step 304, the first device generates a random number, referred to as Nsnk. At step 305, the first device encrypts Nsnk, for example, with the public key of the second device, and sends the encrypted Nsnk to the second device at step 305.

At step 306, the first device generates a PIN. The PIN may be a random value. The PIN may be generated from random data received from the second device. Steps 355 and 356 describe sending the random data to the first device. In other embodiments, the PIN may be a one-time use PIN that is randomly generated by the first device, or the PIN may be the PIN generated from the concatenated values described with respect to step 217 in the method 200.

At step 307, the first device generates instructions to enter the PIN in the second device. For example, instructions are displayed that tell a user to manually enter the pin in the second device, for example, using a keypad or remote control for the second device. The instructions may be displayed on the first device to the user.

At step 357, the PIN is entered in the second device. At this point, each device should have Nsrc, Nsnk, and the PIN, and each device can generate the session key on its own using this information and the same key generation function. At step 308, the first device generates a session key using a key generation function, F, where session key=F(Nsrc, Nsnk, PIN). The second device stores the same function F and generates the same session key using F(Nsrc, Nsnk, PIN). At step 309, the first device encrypts a domain key using the session key, and sends the encrypted domain key to the second device. Note that this is the secure transmission of the domain key to the second device using the session key. The security of the transmission is improved by the use of three random values, including a one-time used PIN, which makes it more difficult for an authorized user to generate the session key and get the domain key. When an attacker is using the first device trying to register with the second device, if the user of the second device does not input the PIN at the second device, the registration will not complete. When the attacker is using the second device to register with the first device, it is even harder because the second device cannot start the registration process. As the PIN is used only once, the attacker cannot use one device to get the PIN and apply to another device without being authorized by the user.

At step 358, the second device decrypts the domain key using the session key it generated. The second device can decrypt the domain key only if it generated the same session key as the first device. The second device sends an acknowledgement message (ACK) to the first device, which indicates that the second device is able to decrypt the domain key. At step 310, the first device receives the ACK to verify that the second device has the correct session key to decrypt the domain key. Now the second device can present the domain key to join the domain of the first device. The registration may then be closed at step 311.

Figure 3B:
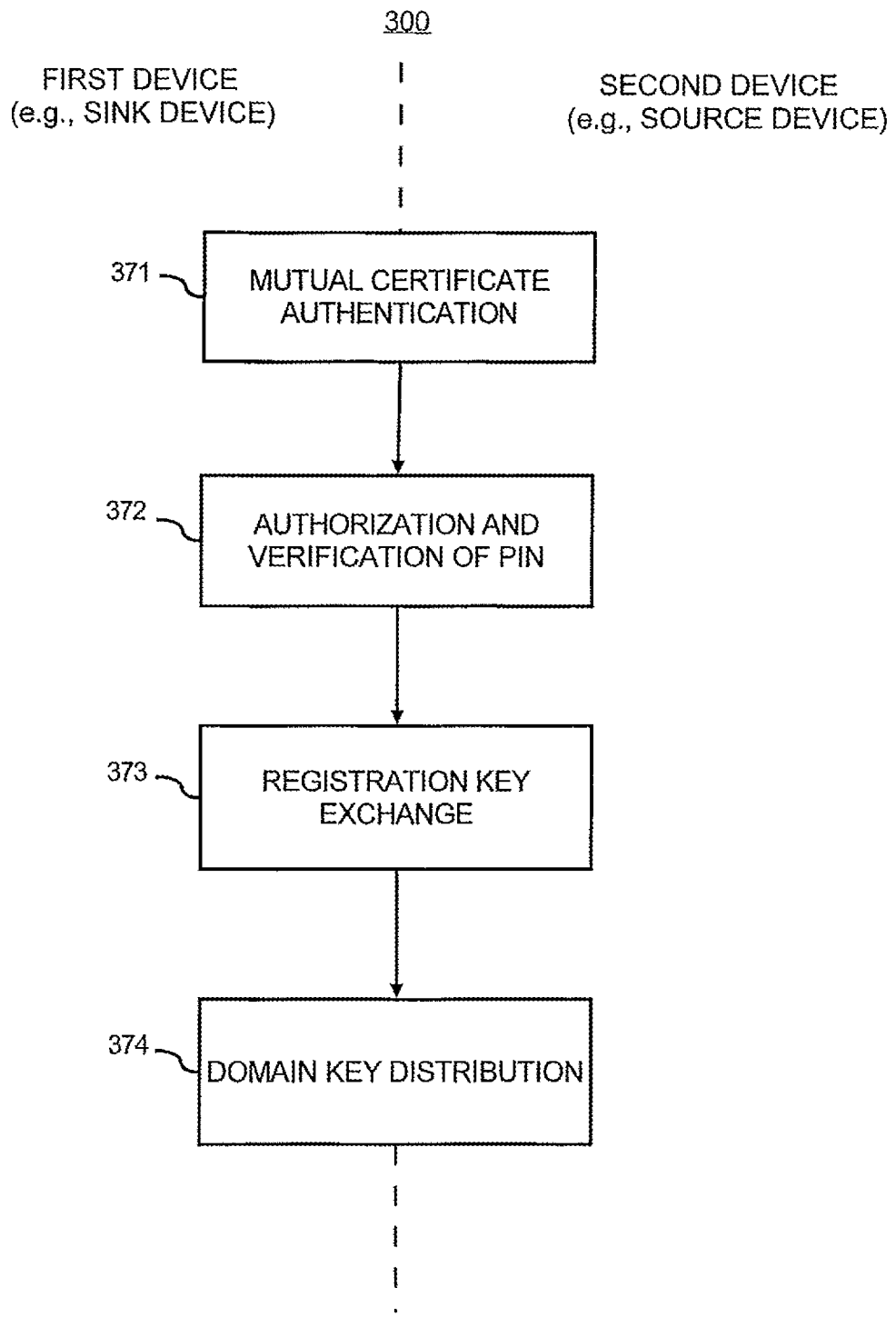
FIG. 3B illustrates a flow diagram of a simplified method for secure and efficient domain key distribution for device registration between a first device and a second device in a wireless network, according to an embodiment of the present invention.

FIG. 3B illustrates a flow diagram of a simplified method for secure and efficient domain key distribution for device registration between a first device and a second device in a wireless network, according to an embodiment of the present invention. The steps of method 300 as described in FIG. 3A is simplified into the four simple functions as shown in FIG. 3B. At step 371, the first device and the second device accomplishes mutual certificate authentication. At step 372, the first device and the second device authorize one-time use PIN and verifies the one-time use PIN. At step 373, the first device and the second device exchange the registration key each other. Finally, at step 374, the first device and the second device distribute the domain key. Thus, the method 300 accomplishes mutual certificate authentication, authorization PIN verification, registration key exchange and domain key.

An embodiment of a method in which the WHDI network 100 as well as the methods 200 and 300 may be employed for targeted discovery in different WHDI devices will now be described with respect to the following flow diagram of the method 400 depicted in FIG. 4. It should be apparent to those of ordinary skill in the art that the method 400 represents a generalized illustration and that other steps may be added or existing steps may be removed, modified or rearranged without departing from the scopes of the method 400. In addition, the method 400 is described with respect to the WHDI network 100, and the methods 200 and 300 by way of example and not limitation, and the method 400 may be performed in other types of networks that may be wired or wireless.

Discovery is the ability to identify other devices in the network that a device may want to communicate with. In general, discovery is performed by broadcasting a device discovery message. Any device that receives the discovery message may respond and thus, both devices discover each other and may ultimately communicate with each other via the network. According to an embodiment, a new type of a device discovery message is a targeted discovery message that includes an identifier in the message that identifies a specific device or a group of specific devices, which only invites the device(s) that are identified in the targeted discovery message to respond. Regardless of a generic discovery message or a targeted discovery message, sometimes a user may not want the user's WHDI device to respond to any or all of discovery messages. To accommodate the user's need for selectively responding to a discovery message to protect a privacy of the user and to maintain a desired security level of WHDI network, multiple device discovery response modes are introduced in the present invention that will be described in further detail below with FIG. 5.

Figure 4:
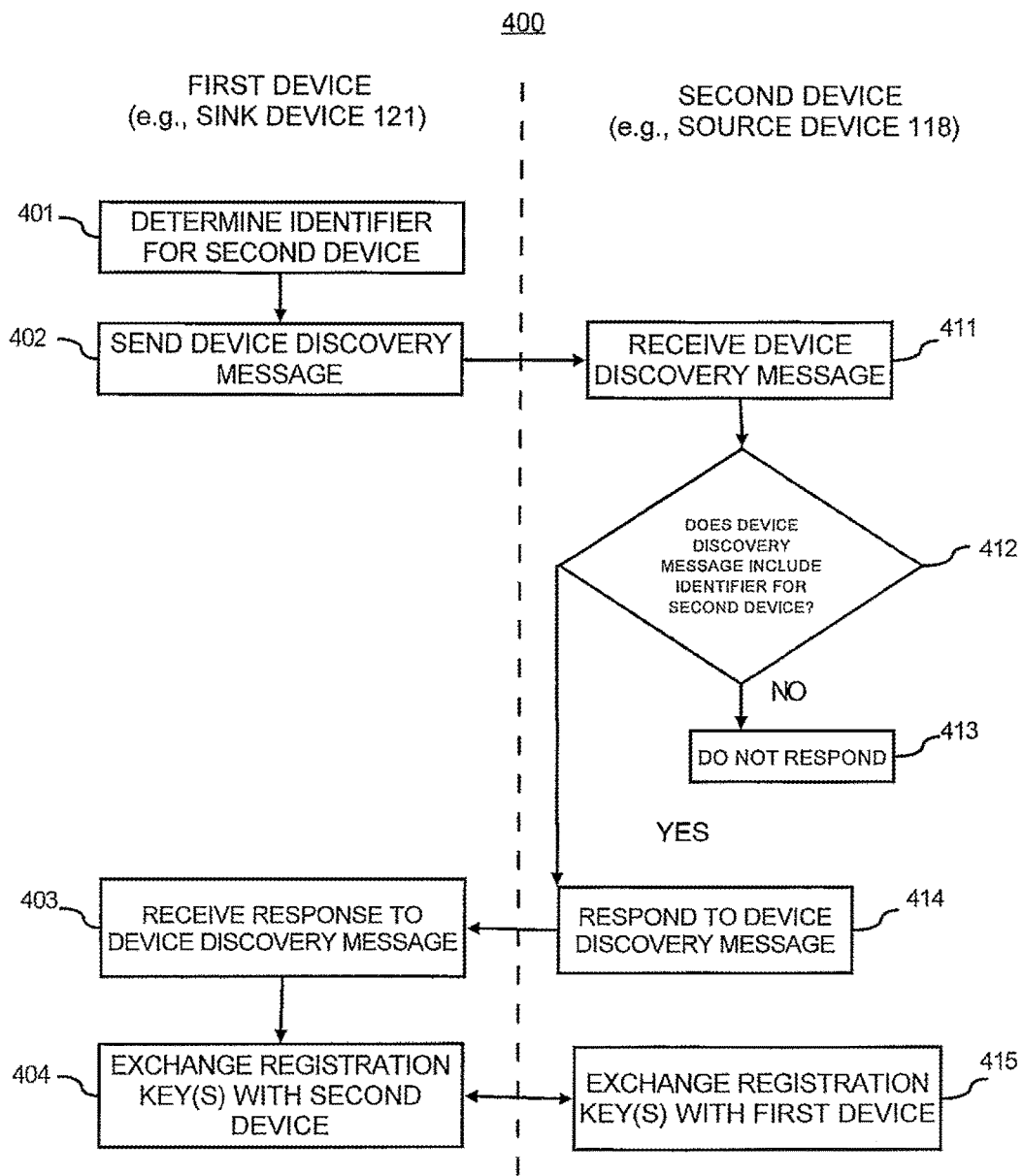
FIG. 4 illustrates a flow diagram of a method for targeted discovery between a first device and a second device in a wireless network, according to an embodiment of the present invention.

FIG. 4 illustrates a flow diagram of a method 400 for targeted discovery between a first device and a second device in a wireless network, according to an embodiment of the present invention, assuming the second device is configured to only respond to the discovery messages that include the identifier for the second device or the group identifier that the second device belongs to. In one embodiment, the first device is a sink device, such as the new sink device 121 shown in FIG. 1, and the second device is a source device, such as the source device 118.

At step 401, the user may input an identifier of the second device into the first device. The identifier can be any information that is unique to a device the identifier refers, such as a device serial number or a WHDI device MAC (Medium Access Control) ID. In one example, the user may read the MAC ID printed on the second device and input into the first device, or the user may type in the domain name of his home domain into the first device manually. In another example, the identifier may be stored on the first device from previous communication and is manually selected by the user from a list of device or domain identifiers. At step 402, the first device sends a device discovery message to the second device using the identifier for the second device. Generally, the discovery message may be sent through unicast, multicast or broadcast. At step 411, the second device receives the device discovery message from the first device and the device discovery message may or may not include the identifier for the second device. When the device discovery message includes an identifier, the identifier may or may not be a correct identifier for the second device.

At step 412, the second device verifies if the device discovery message includes the correct identifier for the second device. The second device is configured not to respond to any discovery message that does not include the identifier for the second device. Thus, at step 413, the second device does not respond to the device discovery message if the message does not include the identifier for the second device. The second device is configured to respond to the device discovery message if the device discovery message includes the identifier for the second device, thus, at step 414, the second device responds to the device discovery message if the message includes its identifier. The response to the discovery message is transmitted to the first device and it includes an acknowledgment of receipt of the sent discovery message and some other information. One example is the information may include the device MAC ID if the targeted discovery message includes a domain identifier so that the new device may get the MAC ID through the domain name.

At step 403, the first device receives the response to the device discovery message from the second device. Thereafter, the first device may start to communicate with the second device for other functionality. For example, the first device at step 404 and the second device at step 415 further exchanges the device registration key and further communicate with each other. It should be noted that discovery may be performed prior to registering to a domain. For example, after discovery, devices may be authenticated as WHDI devices using WHDI certificates, generate and exchange PINs, and then register with a domain through secure transfer of a domain key.

According to an embodiment, a device may be set to one of multiple discovery response modes including always-response mode, limited-response mode, and no-response mode. Referring to the first and second devices described with respect to FIG. 4, which may be the new sink device 121 and the source device 118, respectively, in always-response mode, the second device shall respond all different device discovery messages. For example, a user may choose the always-response mode when a device is a publicly accessible device or when the user does not mind the device being discovered. In always-response mode, the user may optionally set a device to include a response period. If a response period were included, the device shall respond only to any discovery messages arriving within a predetermined specified period.

In limited-response mode, the second device shall respond only to a targeted discovery message as described above in FIG. 4. In no-response mode, the second device does not respond to any device discovery message regardless of the message being a targeted or non-targeted discovery message. A device may be able to operate in any of these modes, and a user may be able to select the particular the mode of operation.

Figure 5:
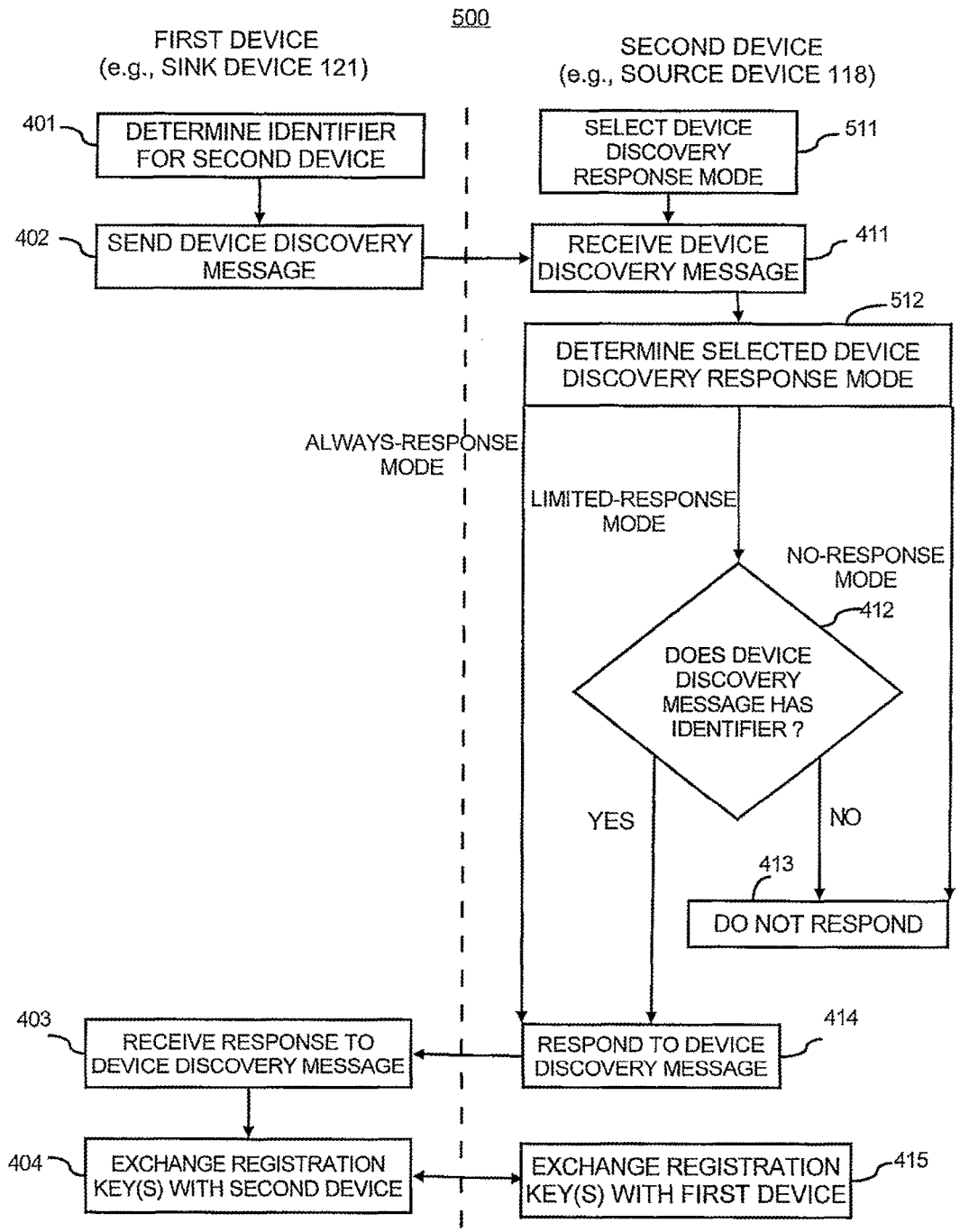
FIG. 5 illustrates a flow diagram of a method for targeted discovery that employs multiple device discovery response modes between a first device and a second device in a wireless network, according to an embodiment of the present invention.

FIG. 5 illustrates a method 500 describing the always-response mode, limited-response mode, and no-response mode used for a device discovery. Many of the steps are the same as the steps in the method 400 and these steps are labeled the same. At step 401, the first device determines an identifier for the second device as an option. At step 511, a user selects the second device to operate in one of the multiple device discovery response modes. At step 402, the first device sends a device discovery message to the second device and the message may include the identifier for the second device. At step 411, the second device receives the device discovery message from the first device.

At step 512, the second device determines the discovery response mode of operation selected at step 511. The second device checks current setting of the device discovery response mode. Thus, the second device does not respond to the device discovery message if the device discovery response mode is set to the no-response mode. However, the second device still responds to the device discovery message even if the message does not include the identifier for the second device when the device discovery response mode is set to the always-response mode.

If the device discovery response mode is set to the limited-response mode, step 512 moves to step 412 and the second device verifies if the device discovery message includes the correct identifier for the second device. At this stage, the second device is configured not to respond to any discovery message that does not include the identifier for the second device. Thus, at step 413, the second device does not respond to the device discovery message if the message does not include the identifier for the second device. The second device is configured to respond to the device discovery message if the device discovery message includes the identifier for the second device, thus, at step 414, the second device respond to the device discovery message if the message includes the identifier. Again, the response to the discovery message includes an acknowledgment of receipt of the sent discovery message and is transmitted to the first device.

At step 403, the first device receives the response to the device discovery message from the second device when the discovery message includes the identifier or when the device discovery response mode is set to the always-response mode. Thereafter, as an example, the first device at step 404 and the second device at step 415 may further exchanges the device registration key and further communicate with each other.

In one embodiment, the second device can wirelessly be set to operate one of device discovery response modes for future discovery messages, for example, using a GUI via a first device after these two devices registered and be able to communicate with each other.

Figure 6:
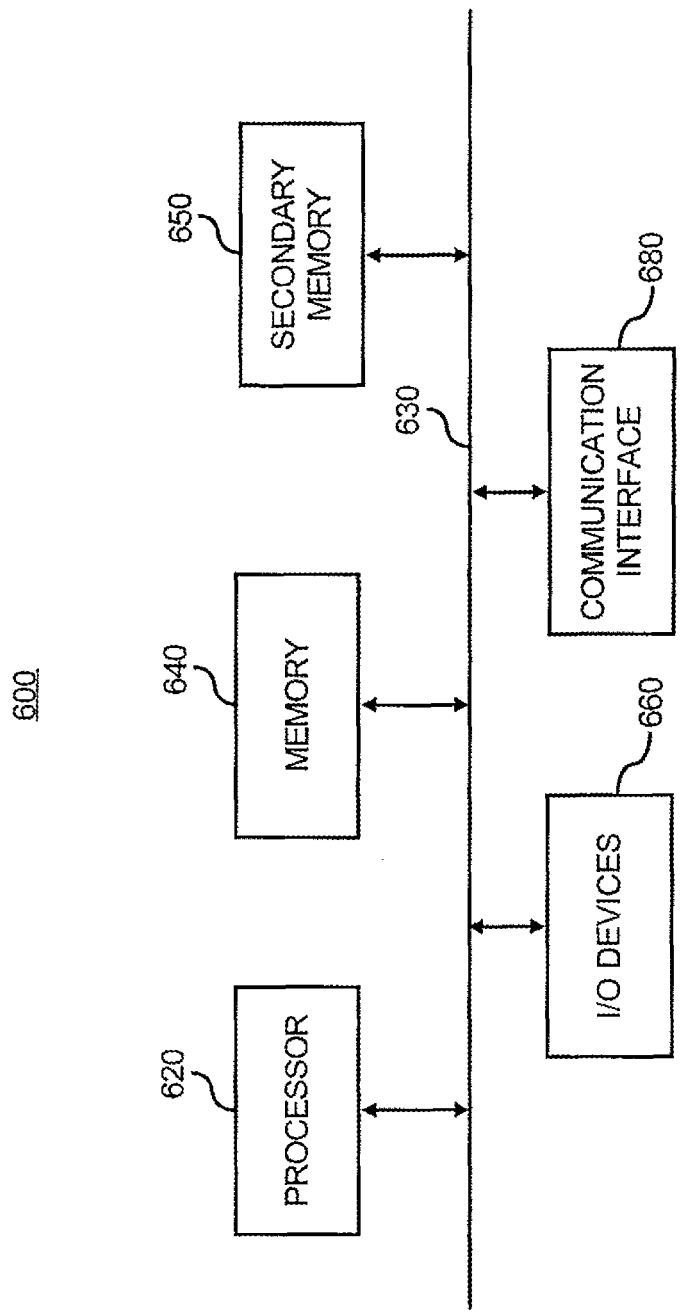
FIG. 6 shows a block diagram of a computer system that may be used as a platform for devices shown in FIG. 1, according to an embodiment of the present invention.

FIG. 6 shows the block diagram of a computer system 600 that may be used as a platform for a first device, second device, source device, or a sink device. The computer system 600 may also be used to execute one or more computer programs performing the method, steps and functions described herein, such as the three different device discovery response modes that may be used for devices shown in FIG. 1. The computer programs are stored in computer readable mediums.

The computer system 600 includes a processor 620, providing an execution platform for executing software. The processor 620 is configured to determine an identifier for the second device of FIGS. 4 and 5 and to send a device discovery message to the second device using the identifier for the second device. The processor 620 is further configured to send a domain key to the second device if a response to the device discovery message is received from the second device of FIGS. 4 and 5. In one embodiment, the processor 620 is configured to wirelessly set the second device to be one of multiple device discovery response modes.

Commands and data from the processor 620 are communicated over a communication bus 630. The computer system 600 also includes a main memory 640, such as a Random Access Memory (RAM), where software may reside during runtime, and a secondary memory 650. The secondary memory 650 may include, for example, a non-volatile memory where a copy of software is stored. In one example, the secondary memory 650 also includes ROM (read only memory), EPROM (erasable, programmable ROM), EEPROM (electrically erasable, programmable ROM), and other data storage devices, include hard disks.

The computer system 600 includes I/O devices 660. The I/O devices may include a display and/or user interfaces comprising one or more I/O devices 670, such as a keyboard, a mouse, a stylus, speaker, and the like. A communication interface 680 is provided for communicating with other components. The communication interface 680 is configured to send the discovery message and the domain key to the second device via a WHDI network. The communication interface 680 may be a wired or a wireless interface. The communication interface 680 may be a network interface.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method of device discovery in a digital interface network of a type having a first device configured to receive a multimedia data stream sourced from a second device, the method comprising:
  receiving a device discovery message from the first device at the second device, the device discovery message comprising a device identifier;
  verifying, by the second device, whether the device discovery message comprises a correct device identifier for the second device;
  in response to verifying, by the second device, that the device discovery message comprises a correct device identifier for the second device, sending a response to the device discovery message to the first device, the response comprising an acknowledgment of receipt of the device discovery message;
  receiving a registration key from the first device at the second device subsequent to sending the response to the device discovery message; and providing by the second device and after receiving the registration key, the multimedia data stream to the first device.

2. The method of claim 1, wherein the second device is configured not to respond to any device discovery message for the network that does not include the correct identifier for the second device.

3. The method of claim 1, further comprising: setting the second device to operate in one of multiple device discovery response modes, the device discovery response modes comprising an always-response mode, a limited-response mode, and a no-response mode.

4. The method of claim 1, wherein the response to the device discovery message comprises a media access control (MAC) address of the second device.

5. The method of claim 1, wherein the device discovery message is unicast to the second device or is multicast to a group of devices that includes the second device.

6. The method of claim 1, wherein the network is a Wireless Home Digital Interface (WHDI) network including end user devices.

7. The method of claim 1, wherein the second device is identified by the device identifier.

8. A non-transitory computer-readable storage medium storing instructions executable by one or more computers which, upon such execution, cause the one or more computers to perform operations for device discovery in a digital interface network of a type having a first device configured to receive a multimedia data stream sourced from a second device, the operations comprising:

receiving a device discovery message from the first device at the second device, the device discovery message comprising a device identifier;

verifying, by the second device, whether the device discovery message comprises a correct device identifier for the second device;

in response to verifying, by the second device, that the device discovery message comprises a correct device identifier for the second device, sending a response to the device discovery message to the first device, the response comprising an acknowledgment of receipt of the device discovery message;

receiving a registration key from the first device at the second device subsequent to sending the response to the device discovery message; and providing by the second device and after receiving the registration key, the multimedia data stream to the first device.

9. The computer-readable storage medium of claim 8, wherein the second device is configured not to respond to any device discovery message for the network that does not include the correct identifier for the second device.

10. The computer-readable storage medium of claim 8, the operations further comprising:

setting the second device to operate in one of multiple device discovery response modes, the device discovery response modes comprising an always-response mode, a limited-response mode, and a no-response mode.

11. The computer-readable storage medium of claim 8, wherein the response to the device discovery message comprises a media access control (MAC) address of the second device.

12. The computer-readable storage medium of claim 8, wherein the device discovery message is unicast to the second device or is multicast to a group of devices that includes the second device.

13. The computer-readable storage medium of claim 8, wherein the network is a Wireless Home Digital Interface (WHDI) network including end user devices.

14. The computer-readable storage medium of claim 8, wherein the second device is identified by the device identifier.

15. A device configured to communicate with other devices on a network and perform device discovery in a digital interface network of a type having another device configured to receive a multimedia data stream sourced from the device, the device comprising:

a processor configured to:
    receive a device discovery message from the another device, the device discovery message comprising a device identifier;
    verify whether the device discovery message comprises a correct device identifier for the device;
    in response to verifying that the device discovery message comprises a correct device identifier for the device, generate a response to the device discovery message, the response comprising an acknowledgment of receipt of the device discovery message; and a data storage device configured to store the device identifier; and a network interface configured to send the response to the device discovery message to the other device, to receive a registration key from the other device subsequent to sending the response to the device discovery message, and to provide by the device and after receiving the registration key, the multimedia data stream to the another device.

16. The device of claim 15, wherein the device is configured not to respond to any device discovery message for the network that does not include the correct identifier for the device.

17. The device of claim 15, wherein the processor is configured to set the device to operate in one of multiple device discovery response modes, the device discovery response modes comprising an always-response mode, a limited-response mode, and a no-response mode.

18. The device of claim 15, wherein the response to the device discovery message comprises a media access control (MAC) address of the second device.

19. The device of claim 15, wherein the device discovery message is unicast to the device or is multicast to a group of devices that includes the device.

20. The device of claim 15, wherein the network is a Wireless Home Digital Interface (WHDI) network including end user devices.

* * * * *